United States Patent [19]

Sears et al.

[11] Patent Number: 5,796,227
[45] Date of Patent: Aug. 18, 1998

[54] INITIALIZATION DAMPING FOR A PERMANENT MAGNET MOTOR

[76] Inventors: Jerome Sears, 428 Glendale Rd., Wyckoff, N.J. 07481; Walter Parfomak, 35 Orchard St., Wallington, N.J. 07057; Walter Kluss, 363 Harding Ave., Clifton, N.J. 07011

[21] Appl. No.: 801,879

[22] Filed: Feb. 18, 1997

[51] Int. Cl.$^6$ ................................ H02K 23/00
[52] U.S. Cl. ............................ 318/254; 318/439
[58] Field of Search .................. 318/696, 685, 318/254, 439, 138

[56] References Cited

U.S. PATENT DOCUMENTS

| | | | |
|---|---|---|---|
| 3,746,900 | 7/1973 | Morley | 310/41 |
| 4,455,513 | 6/1984 | Fulton et al. | 318/138 |
| 4,484,114 | 11/1984 | Ebbs | 318/138 |
| 4,673,849 | 6/1987 | Sears et al. | 318/254 X |
| 4,818,922 | 4/1989 | Sears et al. | 318/254 X |
| 5,227,709 | 7/1993 | Gauthier et al. | 318/685 |
| 5,397,972 | 3/1995 | Maiocchi | 318/439 |
| 5,428,284 | 6/1995 | Kaneda et al. | 318/778 |
| 5,530,326 | 6/1996 | Galvin et al. | 318/254 |
| 5,572,097 | 11/1996 | Cameron | 318/254 |

*Primary Examiner*—Brian Sircus
*Attorney, Agent, or Firm*—Verne E. Kreger, Jr.

[57] ABSTRACT

During the initialization phase, the rotor (or wheel) of a gyroscope is aligned by application of an alignment pulse to insure that it rotates in a known direction upon start up. However, without some means for damping the rotor, the rotor will oscillate about the null position for an excessive period of time. The back emf signal induced in the non-excited winding can be used to generate a feedback signal for modifying the alignment pulse to minimize oscillation. In one variation, the back emf signal is frequency multiplied and inverted, and then combined with the alignment pulse. The combined signal is applied to the winding to rapidly align the wheel.

5 Claims, 4 Drawing Sheets

INITIALIZATION DAMPING FOR A PERMANENT MAGNET MOTOR

BACKGROUND OF THE INVENTION

The arrangements discussed here concern motors of the type disclosed in U.S. Pat. No. 4,673,849, issued on Jun. 16, 1987, to Sears et al. for a Permanent Magnet Motor Closed Loop Restarting System; and U.S. Pat. No. 4,818,922, issued on Apr. 4, 1989, to Sears et al. for Optical Commutation for Permanent Magnet Motors; both incorporated by reference herein. To fix the orientation of the gyro rotor or wheel with respect to the windings for reliable starting, the wheel can be forced to a null position with an alignment pulse applied to one of the windings. Since the wheel floats freely, the pulse will cause the wheel to overshoot the null position and oscillate for a period of time until the energy dissipates.

In some applications, oscillation of the rotor for an excessive period of time is unacceptable. Additionally, since the phase of rotor oscillation is arbitrary, the direction of rotation during start is indeterminate if the motor is started before the rotor settles out. It therefore would be desirable to quickly bring the rotor to a stationary position during initialization.

BRIEF DESCRIPTION OF DRAWINGS

A more complete understanding of the present invention, as well as other objects and advantages thereof not enumerated herein, will become apparent upon consideration of the following detailed description and the accompanying drawings, wherein.

DESCRIPTION OF THE INVENTION

Figure 1:
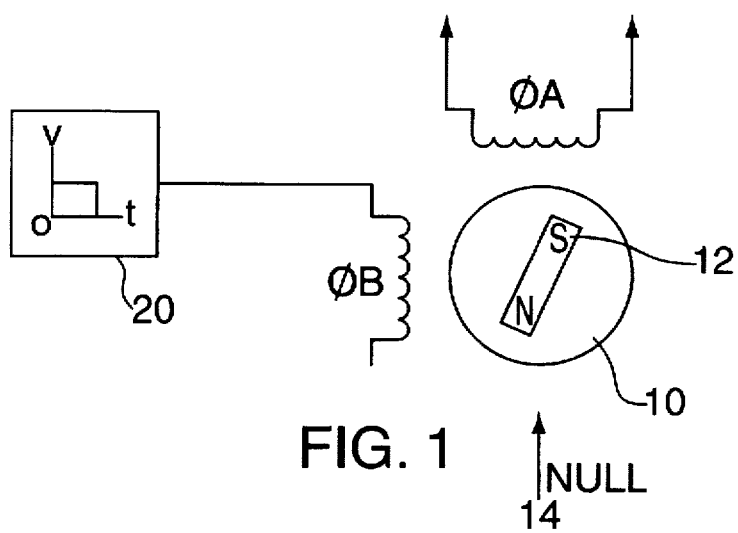
FIG. 1 is a schematic diagram of a gyro wheel alignment circuit.

A schematic diagram of a circuit for aligning the rotor of a brushless permanent magnet motor is shown in FIG. 1. A wheel (or rotor) 10, having a permanent magnet 12, is suspended in magnetic proximity to phase A and phase B stator windings as shown in the figure. An alignment pulse from a pulse generator 20 is applied to the winding arbitrarily labeled the $\phi$B winding, causing the permanent magnet 12 to attempt to align with the flux path generated by the current flowing through the $\phi$B winding (the "null" position 14).

Without some means for damping, the rotor 10 will accelerate, overshooting the null position. The restoring flux generated by the alignment pulse will at some point overcome the inertia of the rotor 10, momentarily stopping the rotor 10. The rotor 10 will then begin to move in the opposite direction, again overshooting the null position, perhaps by a smaller amount, once again reversing direction. The rotor 10 will continue to oscillate back and forth past the null position until the rotational energy in the rotor 10 is less than the flux forces and any applicable friction.

Figure 2:
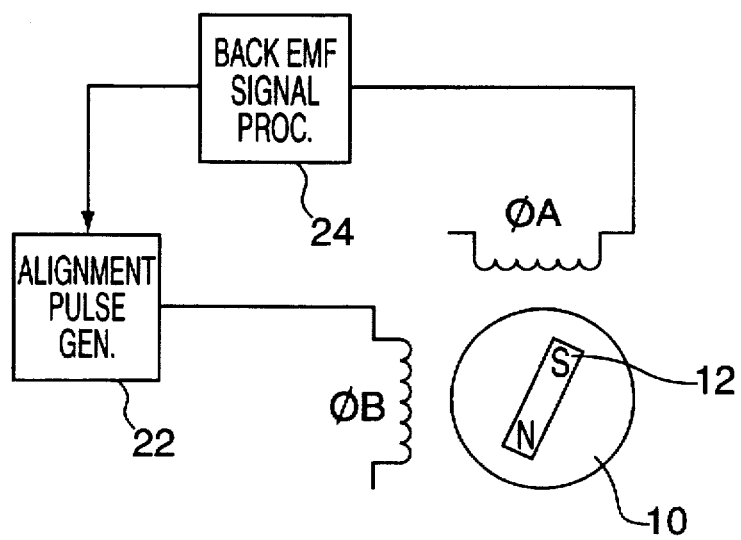
FIG. 2 is a block schematic diagram of a gyro wheel alignment circuit with damping.
Figure 3:
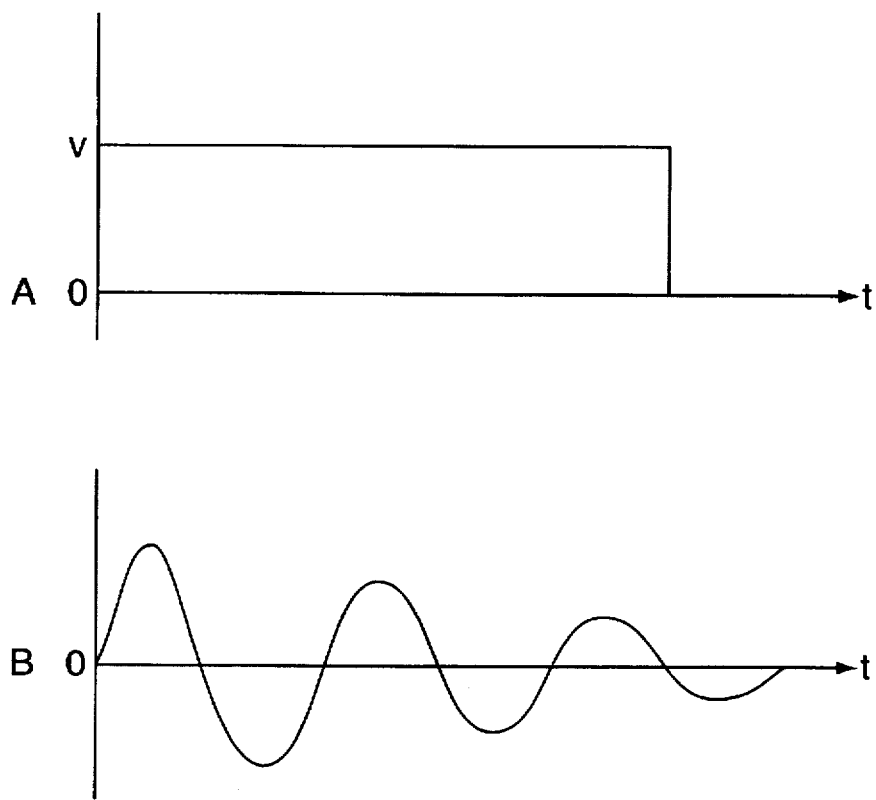
FIG. 3 is a waveform diagram of the signals appearing in the circuit of FIG. 2.

If the alignment pulse applied to the $\phi$B winding were modified, the oscillation could be lessened significantly. A circuit arrangement with the ability to vary the alignment pulse is illustrated in FIG. 2. An alignment pulse generator 22 provides a square wave pulse, shown in waveform A in FIG. 3, to the $\phi$B winding. Although a positive square wave pulse is used here, it should be understood that the polarity could be reversed and another waveshape that would quickly rotate the wheel 10 to the null position could also be used.

When the alignment pulse is first applied to the $\phi$B winding, the wheel 10 will begin to accelerate. As the wheel 10 rotates, the flux of the permanent magnet 12 will cut across the $\phi$A winding, inducing a back emf voltage in the $\phi$A winding. Since the wheel 10 rotates freely, it will begin to oscillate about the null position, and the back emf voltage will thus be sinusoidal, as illustrated by waveform B in FIG. 3.

The back emf signal induced in the $\phi$A winding is provided to a back emf signal processor 24, which generates a feedback signal for the alignment pulse generator 22. The feedback signal will modify the output of the pulse generator 22, augmenting or diminishing the pulse to counter the action of the wheel 10 as it passes the null position to drive the back emf voltage to zero. The back emf signal processor 24 can be a peak signal detector, a demodulator, a conventional but costly torque-to-balance loop, or any other arrangement that will generate a suitable feedback signal.

Figure 4:
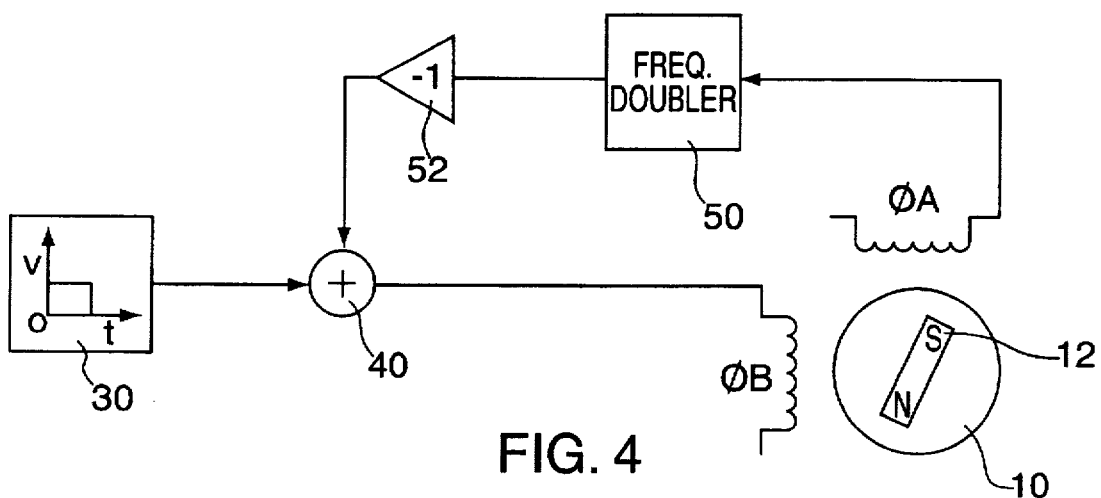
FIG. 4 is a schematic diagram of a gyro wheel alignment circuit with damping.

Another circuit arrangement that will provide damping is illustrated in the schematic diagram of FIG. 4. It should be understood that only the initialization circuitry is shown; the circuitry associated with the actual running and other functions has been eliminated for clarity.

Figure 5:
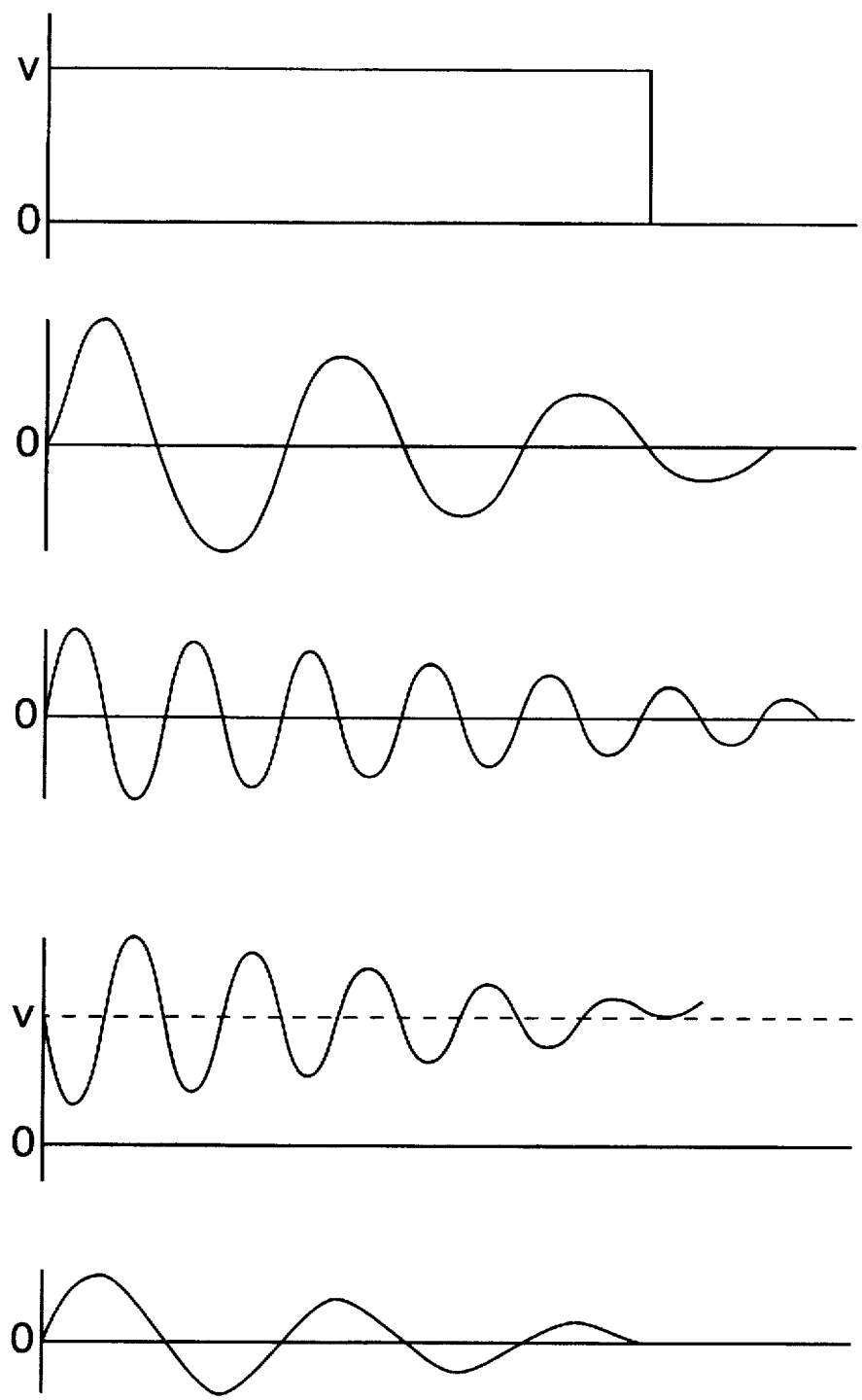
FIG. 5 is a waveform diagram of the signals appearing in the circuits of FIG. 4.

An alignment pulse generator 30 provides a square wave pulse shown by waveform A in FIG. 5 to an input of a summing junction 40; the output of the summing junction 40 is applied to the $\phi$B winding. As the rotor 10 rotates, a back emf voltage will be induced in the $\phi$A winding. The rotor 10 and its magnet 12 will begin to oscillate about the null position, resulting in the waveform illustrated by waveform B in FIG. 5. This oscillating signal is provided to a frequency doubler 50.

The output of the frequency doubler 50, waveform C of FIG. 5, is fed through an inverter 52 to the summing junction 40 where it is added to the output of the pulse generator 40. The combined signal now appearing at the output of the summing junction 40, illustrated by waveform D of FIG. 5, is provided to the $\phi$B winding, closing the loop. As the back emf initially increases, the output of the summing junction 40 will undergo a proportional decrease, due to the addition of the inverted, frequency-doubled back emf voltage from the $\phi$A winding. As a result, the flux applied to the rotor from $\phi$B winding will be less and the resulting back emf will similarly decrease more rapidly than if no feedback were applied, as shown by waveform E of FIG. 5.

Figure 6:
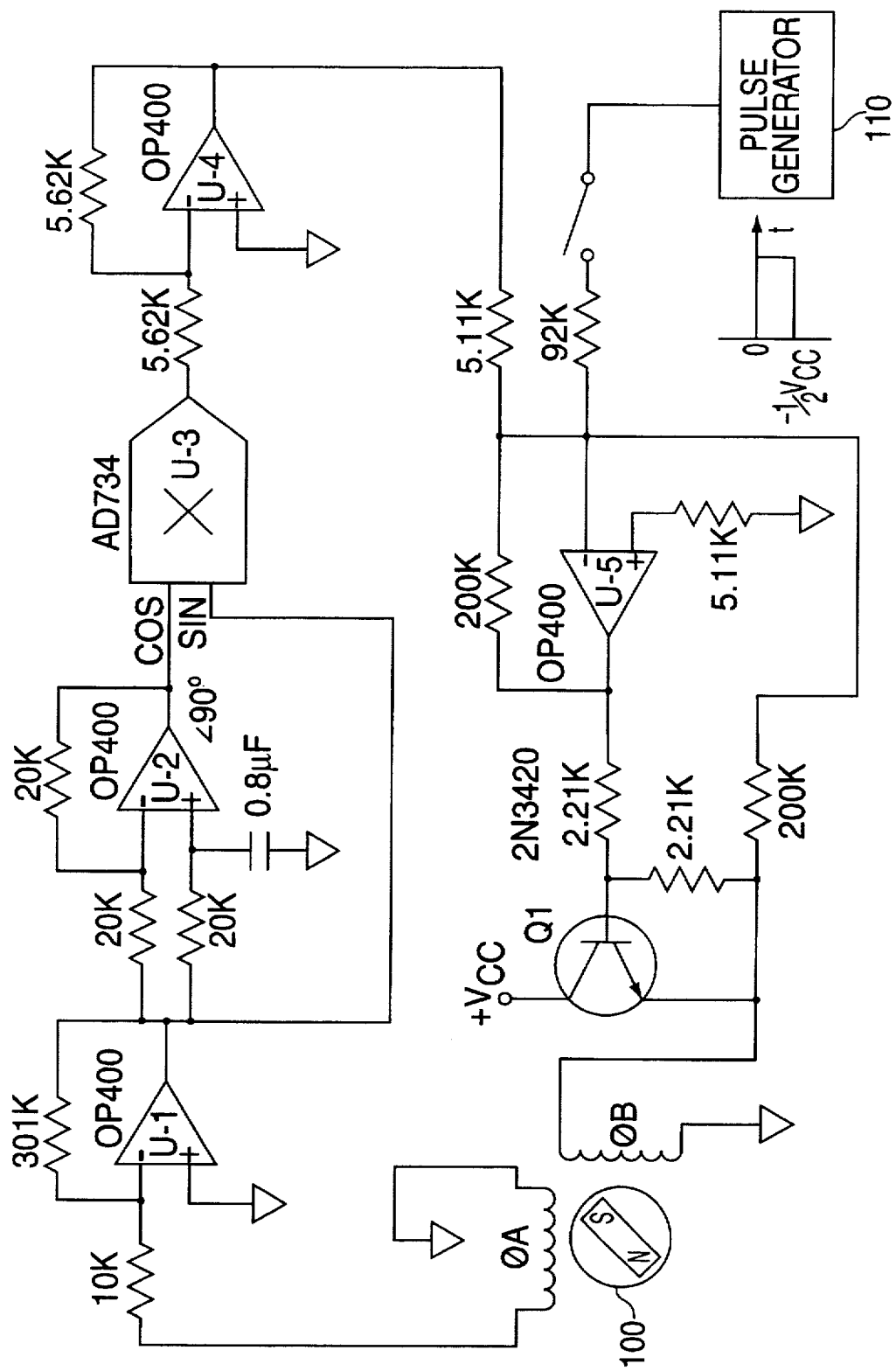
FIG. 6 is a detailed schematic diagram of a gyro wheel alignment circuit with damping.

A detailed embodiment of the initialization damping circuit is shown in FIG. 6. The gyro wheel 100 is positioned adjacent the $\phi$A and $\phi$B windings. An alignment pulse generator 110 provides a negative alignment pulse, as illustrated by the waveform diagram drawn adjacent the pulse generator 110. The back emf induced in the $\phi$A winding is amplified by an inverting amplifier U1. A portion of the inverted amplified back emf signal is phase shifted by inverting phase-shift stage U2. The phase-shifted component and the original inverted amplified back emf signal are provided to respective ports of a multiplier U3 to create a frequency-doubled output. This output in turn passes through an inverting amplifier U4.

The outputs of U4 and the alignment pulse generator 100 are combined at the inverting input of amplifier U5. The output of U5 drives an emitter-follower stage $Q_1$ which in turn provides the modulated alignment signal to the φB winding, closing the loop.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An apparatus, comprising:

rotor for rotating about an axis, the rotor means having a permanent magnet;

at least a first and second winding, each of the windings positioned in magnetic proximity to the rotor means;

pulse generator means for providing an alignment pulse to the first winding, the pulse generator means having an input for modulating the amplitude of the alignment pulse;

means for sensing the back emf induced in the second winding; and means for doubling the frequency of the sensed back emf to generate a double-frequency back emf feedback signal to modulate the pulse and minimize the back emf.

2. A permanent magnet motor apparatus, comprising:

a two-pole permanent magnet rotor;

two-phase stator windings, disposed for driving the rotor;

pulse generator means for generating an alignment pulse and providing the pulse to one of the stator windings; and back emf processor means, responsive to the back emf induced in the other of the stator windings, for generating a double-frequency back emf feedback signal for modifying the output of the pulse generator means.

3. A permanent magnet motor apparatus as set forth in claim 2, further comprising means for combining the alignment pulse with the feedback signal.

4. An apparatus for aligning the rotor of a permanent magnet motor comprising a two-pole permanent magnet rotor and two-phase stator windings disposed for driving the rotor, comprising:

means for generating an alignment pulse and providing the pulse to one of the stator windings;

means for sensing the back emf induced in the other of the stator windings;

means, responsive to the sensed back emf, for generating a double-frequency feedback signal; and means, responsive to the feedback signal, for modifying the alignment pulse to drive the back emf to zero.

5. A method for aligning the rotor of a permanent magnet motor comprising a two-pole permanent magnet rotor and two-phase stator windings disposed for driving the rotor, comprising the steps of:

generating an alignment pulse and providing the pulse to one of the stator windings;

sensing the back emf induced in the other of the stator windings;

in response to the sensed back emf, generating a double frequency feedback signal; and in response to the feedback signal, modifying the alignment pulse to drive the back emf to zero.

* * * * *

UNITED STATES PATENT AND TRADEMARK OFFICE
CERTIFICATE OF CORRECTION

PATENT NO. : 5,796,227
DATED : August 18, 1998
INVENTOR(S) : Jerome Sears; Walter Parfomak; Walter Kluss It is certified that error appears in the above-identified patent and that said Letters Patent is hereby corrected as shown below:

On the title page insert the following:

-- [73] Assignee: AlliedSignal Inc., Morristown, NJ --

Signed and Sealed this

Eighth Day of June, 1999

*Attest:*

Q. TODD DICKINSON

*Attesting Officer*     Acting Commissioner of Patents and Trademarks